United States Patent Office 3,164,982
Patented Jan. 12, 1965

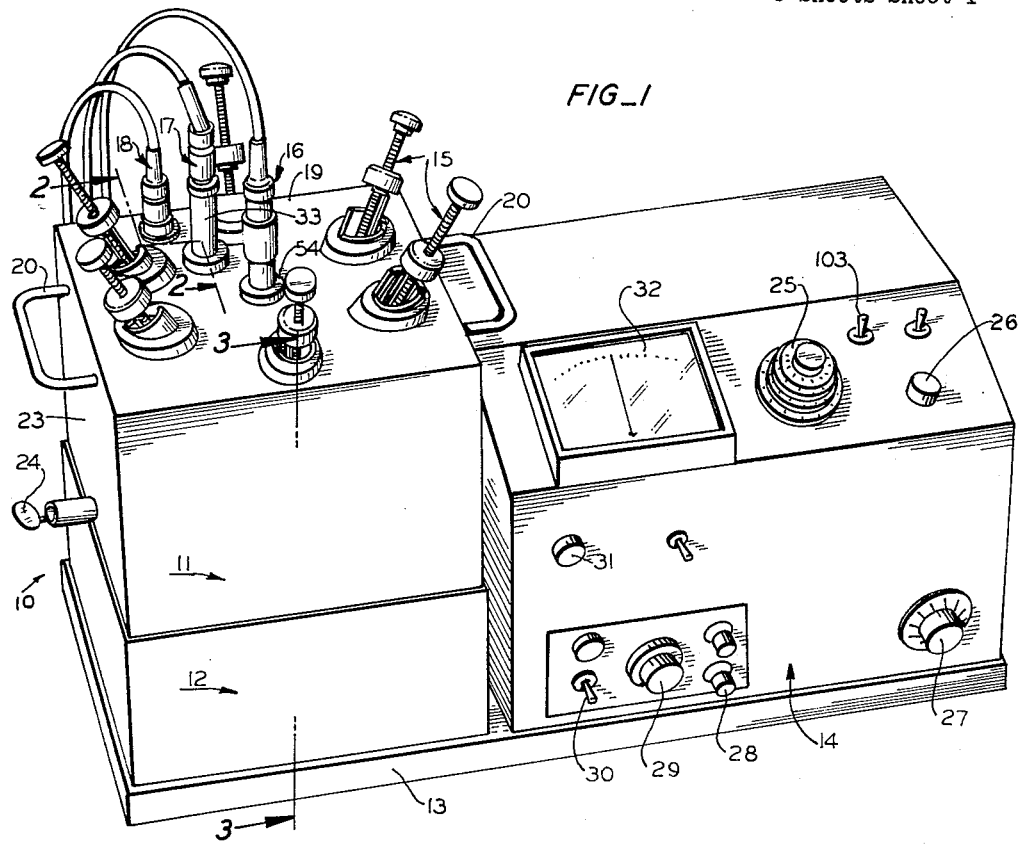
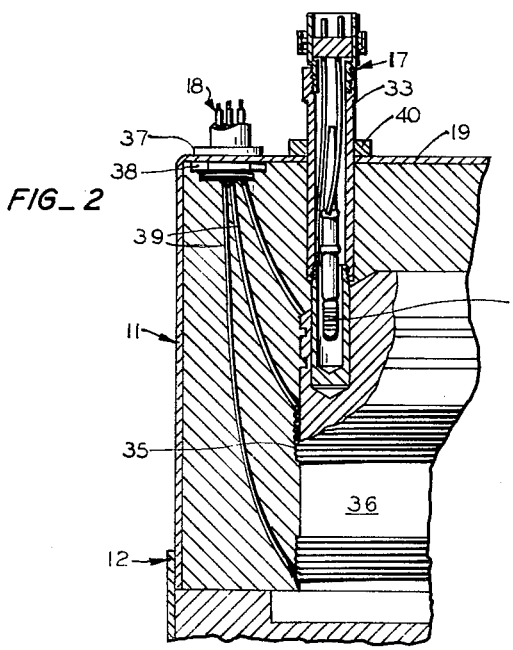
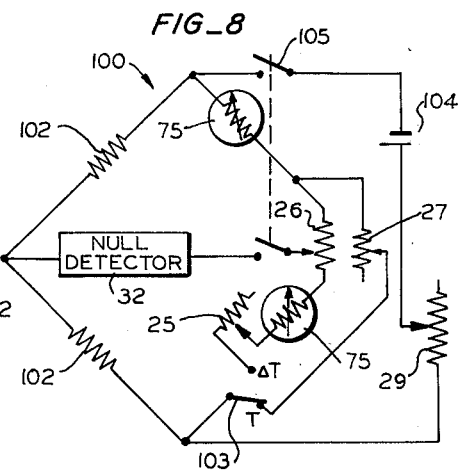
INVENTORS
RAPHAEL A. PASTERNAK
LEONARD A. CAVANAGH
HARRY C. EHRMANTRAUT
BRUCE D. MARSHALL
BY Boyken, Mohler & Wood
ATTORNEYS

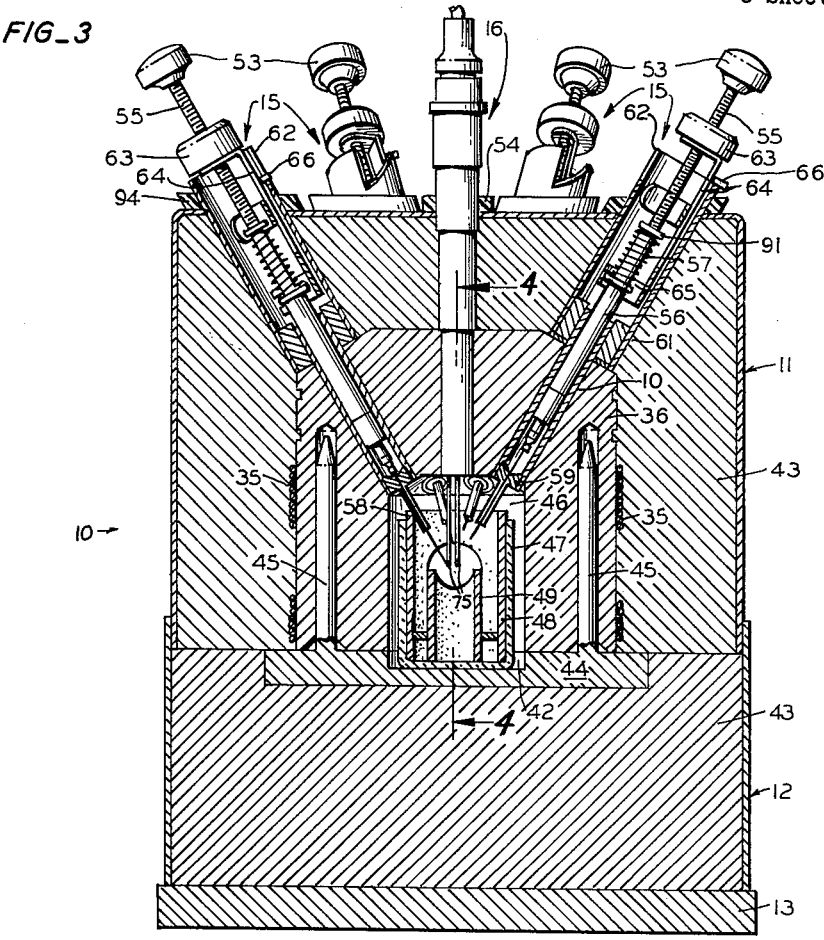
FIG_3
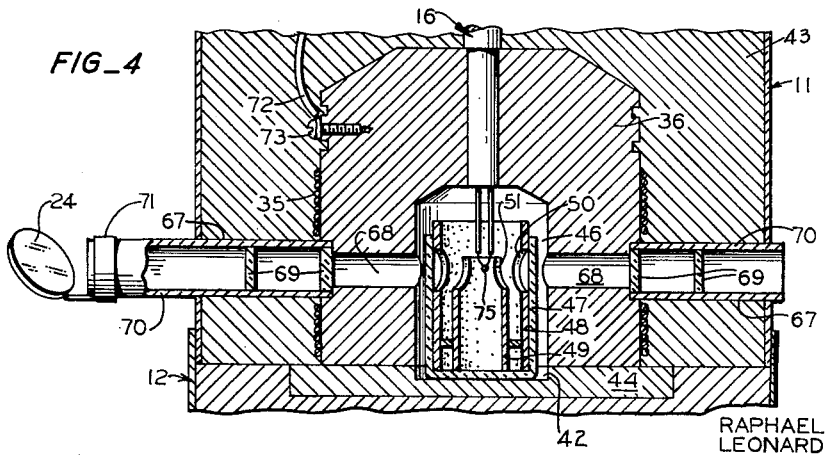
FIG_4
INVENTORS
RAPHAEL A. PASTERNAK
LEONARD A. CAVANAGH
HARRY C. EHRMANTRAUT
BRUCE D. MARSHALL
BY Boyken, Mohler & Wood
ATTORNEYS

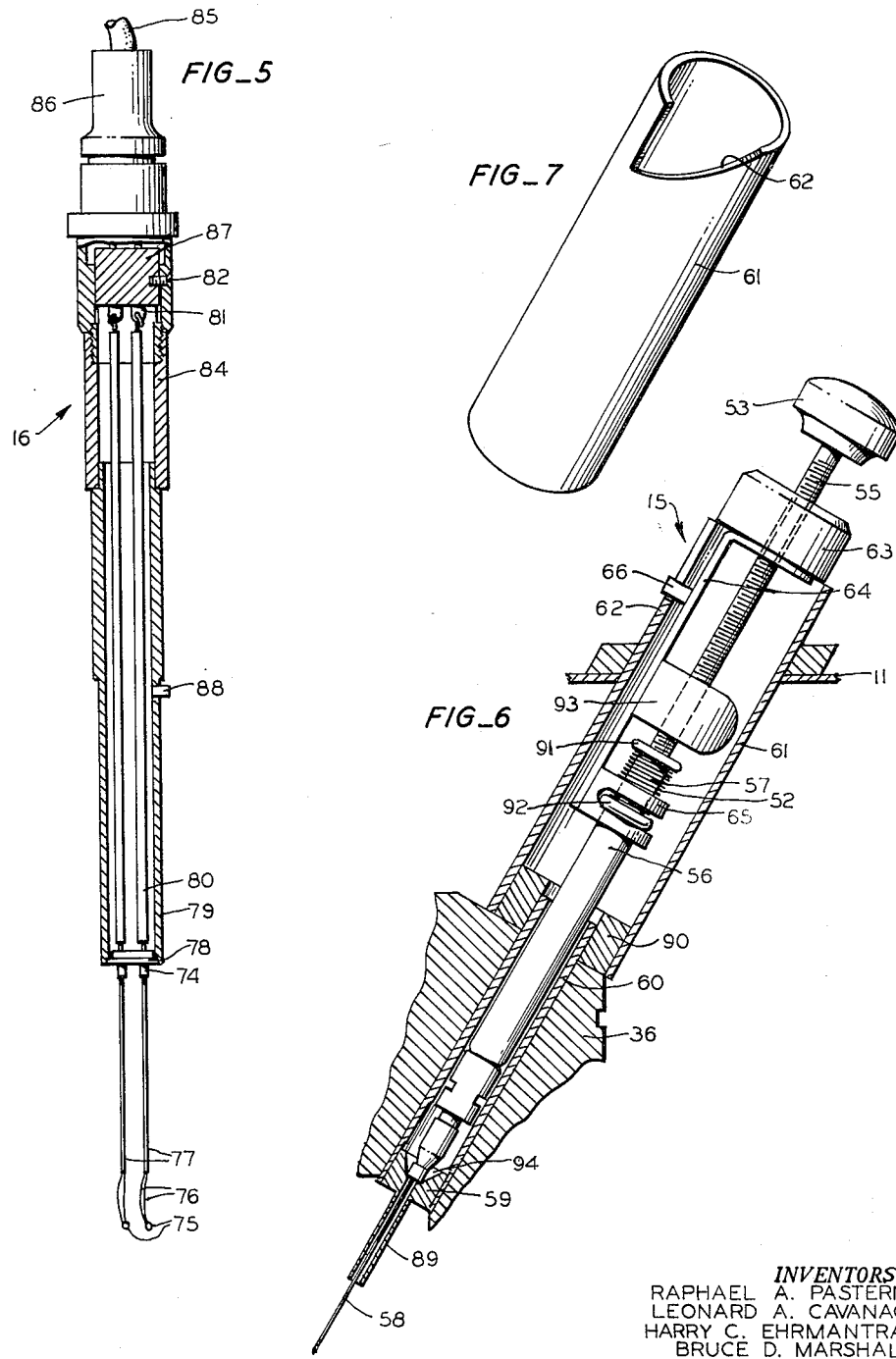

3,164,982
THERMOELECTRIC OSMOMETER
Raphael A. Pasternak, San Mateo, Leonard A. Cavanagh, San Jose, Harry C. Ehrmantraut, Los Altos, and Bruce D. Marshall, Palo Alto, Calif., assignors to Mechrolab, Inc., Mountain View, Calif.
Filed Feb. 14, 1961, Ser. No. 89,313
10 Claims. (Cl. 73—53)

This invention relates to apparatus for use in determining the molecular weight of a solute in solution and more particularly to a thermoelectric osmometer employing thermistors as temperature sensitive elements in the measurement of the difference in temperature between a solution and its solvent.

It is known that a solution of any given solvent will always have a lower vapor pressure than the pure solvent. When a solution and its solvent are compared in a closed, conditioned chamber saturated with the solvent vapor, a differential mass transfer will occur between the two because of the difference in vapor pressure. The result is a greater condensation on (or lower evaporation from) the solution than on or from the solvent. Such transfer causes a temperature difference to exist between the solution and solvent (because of the heat of vaporization) which is proportional to the lowering of the vapor pressure of the solution, and hence proportional to the solute concentration.

This temperature difference has been measured by the use of thermally sensitive elements, such as thermocouples or thermistors, in conjunction with an electrical bridge circuit. The temperature difference is dependent upon the number of dissolved molecules in the solution and independent of their chemical characteristics, so that an instrument for determining the temperature differences may be calibrated with a concentration series of a known solute. A calibration curve constructed from the results of such a series may then be used to determine molecular weights of unknown solutes in the same solvent by determining the temperature differences.

Of the prior apparatus known for determining molecular weight in this manner, most has been laboratory constructed equipment which required considerable time and precise manual dexterity for operation. It has been the practice to place drops of the reference solvent and sample solution to be compared on thermally sensitive elements with eyedroppers or the like and then to isolate the elements with the solvent and solution drops thereon in a controlled atmosphere saturated with the solvent vapor. Such practice has demanded considerable experience to properly manipulate known apparatus and has often resulted in inaccurate results because of the many possible variations in control of such apparatus.

It is therefore the main object of this invention to provide apparatus for use in determining molecular weights of solutes in solution, which apparatus overcomes many of the problems inherent in prior art apparatus employed for similar purposes.

It is another object of this invention to provide apparatus for use in determining the molecular weight of a solute in solution, which apparatus is simple to operate yet produces rapid and accurate multiple results.

It is a further object of this invention to provide apparatus for use in accurately measuring minute temperature differences between solvents and solutions thereof in a stable conditioned chamber, in which apparatus a number of such measurements may be made of different solutions without disturbing the conditioning of the chamber.

Still another object of this invention is the provision of apparatus for comparing a variety of solutions with a reference solvent by applying drops of the same to thermally sensitive elements in a controlled environment, such apparatus providing for exacting control of the application of the drops to the elements and the size of such drops.

Other objects and advantages will become apparent from the following description taken in connection with the accompanying drawings, in which:

FIG. 1 is a perspective view of the osmometer apparatus of this invention showing the sample chamber envelope and associated measuring unit;

FIG. 2 is a cross-sectional view taken along line 2—2 through the sample chamber envelope of FIG. 1, showing the thermostat and heater connectors;

FIG. 3 is a cross-sectional view taken along line 3—3 of FIG. 1 showing in detail the thermal envelope containing the sample chamber, the syringe units and thermistors;

FIG. 4 is a cross-sectional view taken along line 4—4 of FIG. 3 showing the viewing apertures through which the sample chamber may be observed;

FIG. 5 is an enlarged cross-sectional view through the probe containing the thermistors;

FIG. 6 is an enlarged cross-sectional view through a syringe and hypodermic needle unit, showing means for moving the syringe into sample applying position;

FIG. 7 is a perspective view of the upper portion of the holder within which the syringe assembly unit is disposed; and, FIG. 8 is a schematic wiring diagram of a measuring bridge for use with the osmometer of this invention.

Referring more specifically to FIGS. 1 and 2, the apparatus, in essence, comprises two major portions; a thermal envelope 10, including upper and lower housings 11, 12 containing thermal block 36 and supported on a base member 13, and the control unit housing 14, which contains a Wheatstone bridge, a null indicator and heater input control circuit, supported on said base member adjacent said housing. The upper housing as shown in FIG. 1 carries syringe holders 15, the thermistor probe assembly 16, the thermostat assembly 17 and heater connector 18 upon its upper surface 19 and is provided with handles 20 for easy removal of the upper unit. The upper housing is also provided on one lateral face with a viewing mirror 24 and optical tube 70, which passes through the upper housing member 11. The control unit housing 14 (FIG. 1) carries a decade resistance dial 25, balance control knob 26, a potentiometer dial 27, ground terminal 28, sensitivity control and zero adjust knobs 29, power switch 30, thermostat pilot light 31, selector switch 103, and null indicator dial 32. Thermal envelope 10 houses a sample chamber 46, to be later described in detail, which is conditioned to provide a stable environment in which to make the measurements desired with this apparatus. FIG. 2 shows in more detail the heater connector 18, which is operatively connected to the heating coils 35 surrounding the thermal block 36, and the thermostat assembly 17 by means of which a constant temperature of the thermal block 36 and chamber 46 may be maintained. As shown in FIG. 2, the heater connector 18 is held in place by nuts 37, 38 and is provided with connecting cables 39. FIG. 2 shows the thermostat assembly 17 fixedly secured by the collar 40 disposed upon the upper face 19 of upper housing member 11. The thermostat 22 is protected by a sleeve 33 projecting into the thermal block 36.

FIG. 3 shows most clearly the thermal block 36 centrally disposed within the upper housing member 11. Thermal block 36 is preferably a cylinder of aluminum having a central downwardly opening partial bore or chamber 46 formed therein. The lower end of block 36 rests on a plate or support member 44, preferably also formed of aluminum, provided with an upwardly opening depression 42 comparable in cross-section to and communicating with bore 46 to enclose the chamber formed thereby. Member 44 is supported in lower housing 12.

Housings 11 and 12 may be conveniently formed in box shapes of light sheet metal so that the lower open end of the former is telescopically received in the upper open end of the latter (FIG. 3). The space between the thermal block 36 and the upper housing member 11 as well as between plate 44 and the lower housing member 12 is filled with urethane foam 43 or like cast-in-place material for the purpose of insulating block 36 and its chamber 46, and providing structural support for the various elements carried by envelope 10.

Support member 44 is provided with upwardly projecting guide pins 45 received in bores in block 36 for aligning the removable upper housing member 11 with the lower housing unit 12. This unique arrangement of guide pins 45 and the telescoping upper and lower housings permits the easy removal and accurate replacement of the upper housing member and constitutes a significant advance over prior art devices which are characterized by difficulty of access to the sample chamber. The engaging surfaces of housings 11 and 12 are fitted so as to substantially seal chamber 46 from the atmosphere.

A transparent solvent cup 47 is disposed within the sample chamber 46, and received in depression 42, and contains an absorbent liner comprising essentially an absorbent tubular outer element 48, engaging the sides of the cup 47 and absorbent tubular inner wick element 49. As shown best in FIG. 4, both the absorbent outer member and absorbent inner wick member have transverse, opposing viewing apertures 50 and 51, respectively, which are in alignment. These apertures permit the viewing of the sample chamber, and particularly the thermistors 75 therein, through the viewing mirror 24 and optical tube 70. The liner and wick elements 48, 49 are adapted to be saturated with a solvent in cup 47 for the purpose of maintaining a conditioned atmosphere in chamber 46 saturated with the vapor of such solvent.

Thermistor probe 16 is supported centrally of upper housing 11 (FIG. 1) so that the thermistors 75 carried at the lower end thereof are positioned generally centrally of chamber 46 (FIG. 3). FIG. 5 shows the thermistor probe assembly 16 in detail. The thermistors, or thermally sensitive resistors on which the sample drops are placed, are approximately 0.043 inch diameter beads 75 each mounted at the juncture of a pair of 0.004 inch wires 76. These wires are in turn soldered or otherwise attached to two pairs of heavier beryllium copper leads 77 which support the thermistors in spaced relation in the sample chamber 46. These exposed copper leads 77 pass through a solder seal 78, which is flush with the end of the elongated, hollow tube member 79 into the interior of said tube member where, covered with a protective sleeving 80, they are soldered or otherwise electrically connected to the posts 81 on a connector 87. A set screw 82 secures the connector 87 to the upper sleeve portion 84 of tube 79 which may be formed of insulating material. The cable 85 and cable attachment 86 shown in FIG. 5 are of conventional construction and serve to electrically connect the leads from thermistors 75 to the measuring bridge of FIG. 8. Key 88 received in a notch (not shown) in block 36 serves to properly orient the thermistors 75 with respect to the sample chamber 46. Set screws in ring 54 may be employed to secure probe 16 in place projecting into housing 11.

The most delicate elements of the assembly are the thermistor beads 75 mounted on extremely fine wires 76. Because these beads must be thoroughly isolated, the probes are insulated to prevent shorting by electrolytes. Two probes are preferably available for use with a single unit, one being used for organic solutions and the other for aqueous solutions to prevent contamination.

Upper housing 11 also carries a plurality of circumferentially spaced syringe holders 15 (FIG. 3) slantingly mounted with their longitudinal axes converging generally centrally of chamber 46. Each syringe holder comprises an elongated sleeve 61 (FIGS. 3, 6) having a relatively large central bore, opening outwardly of the upper surface 19 of housing 11 and extending slantingly through insulation 43 to thermal block 36. At its inner end sleeve 61 is provided with an internal collar 90 supporting the upper end of a coaxial tube 60 of relatively smaller diameter than sleeve 61. Tube 60 projects through a slanting bore in block 36 and is provided with an apertured block 59 at its lower end opening into chamber 46. Projecting into chamber 46 from block 59 is a relatively small bore tube 89 which is aligned with and communicates through the aperture in block 59 with the interior of tube 60.

Each holder 15 is adapted to receive therein a conventional hypodermic syringe with the barrel 56 thereof received in tube 60 and projecting upwardly into sleeve 61. The needle connector at the lower end of barrel 56 rests on block 59 and needle 58 projects through tube 89 into chamber 46. Preferably the aperture 94 in block 59 has sloping sides to facilitate guiding needle 58 into tube 89. Tubes 60 and 89 have internal diameters such as to provide close sliding fits with barrel 56 and needle 58, respectively, whereby with the syringe received in holder 15 chamber 46 will remain substantially sealed from the atmosphere.

The longitudinal axes of holders 15 and therefore the syringes received therein are convergently directed toward thermistors 75 (FIG. 3) for applying drops of the solutions to be compared on said thermistors from needles 58. Preferably, one of the needles is thus aimed at one of the thermistors (the reference thermistor) for applying a drop of the standard or solvent thereto and the remaining needles are aimed at the other thermistor (the sample thermistor) for sequentially applying drops of the sample solutions to said other thermistor.

Means for retracting each needle 58 from a lower, drop-applying position closely adjacent a thermistor 75 is provided by a connecting member 64 (FIGS. 3, 6) which carries fingers 65 at its lower end embracing the flange 92 on the syringe barrel 56. The upper end of member 64 at the outer, open end of sleeve 61 is provided with a knob 63 by which member 64 may be rotated about the axis of said sleeve.

Intermediate its ends member 64 is provided with an outwardly projecting lug or cam 66 which engages a slanting cam ramp 62 (FIGS. 6, 7) formed in the upper end of sleeve 61. Turning member 64 with knob 63 causes lug 66 to ride up or down ramp 62 to thereby raise or lower the syringe connected to said members. The lower dwell of ramp 62 is positioned such that the tip of a needle 58 will be closely adjacent the proper thermistor 75 when cam 66 is on such lower dwell and the syringe is in the correct position for accurately applying a drop of solution (or solvent) to such thermistor. Upon rotating member 64 to cause cam 66 to move up ramp 62 onto the outer flat end of sleeve 61, the connected syringe will be drawn outwardly of tube 60 retracting needle 58 from the thermistor so that the thermistors will be isolated for accurate measurement of the desired results.

The flow of liquid solvent or solution from each needle 58 is controlled by a feed screw 55 (FIGS. 3, 6) which is threadedly received through knob 63 and is provided at its upper end with a knob 53. The inner end of screw 55 engages the upper end of plunger 57 of the syringe for pushing said plunger into barrel 56 to cause the liquid therein to be ejected from needle 58. A coil spring 52 acting between flange 92 of barrel 56 and a flange 91 at the upper end of plunger 57 of the syringe serves to maintain the plunger in contact with screw 55 and to accurately control the feeding of solution from the syringe. A spring clip 93 may project from member 64 and embrace plunger 57 (FIG. 3) for stabilizing the connection between said member and the syringe.

The optical tube assembly, shown most clearly in FIG. 4, comprises an angled mirror 24 secured to one of a pair of substantially rigid viewing tubes 70 by a collar 71. The upper housing member 11 and thermal block 36 are respectively provided with aligned apertures 67, 68, the former of which receives the viewing tubes 70 so that the mirror may reflect the interior of the sample chamber 46. The absorbent liner 48 is so shaped as to provide openings in alignment with apertures 67, 68 and viewing tubes 70 so that the positions of the thermistors and hypodermic needles, the size of sample drops, and the transfer of sample drops from the hypodermic needles to the thermistors may be seen and accurately controlled. Tubes 70 closely fit apertures 67 and are provided with lenses 69 to maintain chamber 46 substantially sealed from the atmosphere.

In order to compare the temperatures of the thermistors 75 and thereby arrive at the temperature difference which is proportional to the solute concentration, the thermistors may be connected in a bridge circuit such as shown in FIG. 8. Matched thermistors 75 are connected in two adjacent legs of the bridge 100 with a balancing potentiometer 26 at the juncture between such legs. The opposite legs of the bridge include matched resistors 102 and a null detector 32 is connected across the juncture between said opposite legs and the juncture between the thermistor legs. (It will be noted that the same reference numerals are used on the elements of FIG. 8 as are used on their dials or control knobs in FIG. 1.)

Connected in the leg with the one of the thermistors 75 that is adapted to carry drops of the sample solutions is a variable decade resistor 25, the dials of which are calibrated to indicate the amount of resistance added to the leg by resistor 25. A temperature balancing potentiometer 27 is connected through selector switch 103 in a shunt across the leg including resistor 25, thermistor 75 and potentiometer 26. Switch 103 has two positions, T and ΔT, and when closed to the former completes the circuit through the shunt including potentiometer 27. When closed to the ΔT position, switch 103 completes the bridge circuit through the leg including sample thermistor 75 (lower right in FIG. 8).

Connected across the other juncture points of the bridge opposite the diagonal carrying the null detector 32 is the power supply including a battery 104, voltage adjusting potentiometer 29, and a switch 105.

In operation a drop of sample solution and a drop of standard solvent are suspended side by side on thermistors 75 in the closed chamber 46 saturated with solvent vapor. The absorbent liner 48 and wick element 49 provide a uniformly saturated vapor atmosphere in a simple yet efficient manner. A temperature difference proportionate to the vapor pressure lowering, and hence, proportionate to the solute concentration of the sample solution results in an unbalancing of the resistances of thermistors 75 which can be measured by bridge circuit 100. Because this temperature shift is, for all practical purposes, a colligative effect dependent upon the number of dissolved molecules, the instrument may be calibrated with a concentration series of a known solute. It is consequently possible to read unknown solutions in the same solvent directly from a constructed calibration curve. Extensive experimentation has shown that the described method of ascertaining molecular weight is best effected when working with dilute solutions though it will be understood that the present invention is not restricted to specifically designated concentrations.

Generally speaking, concentrations between approximately 0.01 and 0.1 molar are optimal. Condensation at higher concentrations tends to cause concentration shifts and tests employing lower concentrations result in difficulty in replication. For example, a 0.01 M solution of a benzene solvent results in the order of 0.016° C. temperature difference between the drops. At this level accuracy may be consistently maintained.

Though the present invention is not restricted to a specific solvent, it has been found that sensitivity varies with the solvent employed and is dependent to a great extent upon boiling point, heat of vaporization and molecular weight. Broadly considered, benzene, toluene and carbon tetrachloride are preferred solvents for use with the described apparatus. Tests have shown that solvents possessing higher molecular weights tend to show greater sensitivity. Since, in essence, operation of the described thermoelectric principle requires the solution drop to retain a constant concentration, the instrument is of necessity limited to solutes of comparatively low vapor pressure. Though this vapor pressure may vary somewhat, it is generally preferred that the ratio of vapor pressure of solvent to that of solute should be comparable to the percentage accuracy desired. For example, if employing benzene at a temperature at which the vapor pressure is 100 mm. the solute vapor pressure should be no greater than 1 mm. for 1% accuracy, no greater than 5 mm. for 5% accuracy, etc.

The comparative simplicity of operation of the present apparatus will be apparent from the following description. From the standpoint of thermal equilibrium, if the thermal block is at room temperature about 2–3 hours are generally required for it to reach equilibrium. The heater circuits may be designed to be left on continually thus avoiding delay. It should be noted, however, that if the sample chamber is opened to remove liquid from the cup 47, at least 30 minutes and usually no more than 45 minutes are required to re-establish stabilization. Because of the unique construction of the present apparatus, if only the syringes are exchanged or refilled, no waiting is necessary. This constitutes a significant time saving feature under laboratory conditions. Moreover the positioning of the syringes and needles within the syringe assembly, the unique features for moving the syringes and controlling injection, and the presence of a viewing tube assembly makes possible virtually limitless changes of solution without interruption. These features and the resulting operational advantages are notably absent from devices heretofore used.

In preparing the sample chamber, the upper chamber assembly of housing 11 and block 36 is removed, the solvent cup 47 is thoroughly rinsed using the appropriate standard solvent, and the absorbent liner 48 and wick member 49 are then installed in the cup and the cup filled with the solvent to a level below the bottom of the viewing apertures 50 and 51. The cup 47 is then placed in the depression 42 and the apertures 50 and 51 aligned transversely of guide pins 45. The upper housing is then replaced in the lower housing 12 employing the guide pins 45 which are received in apertures in the thermal block to properly orient the viewing tubes 70 with apertures 50, 51. Because the present apparatus is provided with these guide pins 45, and the abutting surfaces of the housings 11, 12 are smooth any danger of misalignment is obviated. The cable connections are then checked and the heater turned on.

The syringes must be thoroughly rinsed with the solvent since even very slight contamination of the samples will vitiate results. When very dilute samples are employed, each sample syringe is preferably rinsed with sample solution and emptied before the sample to be tested is loaded. Since only about 4 drops are required, 0.1 ml. of each sample is satisfactory even for several replicate measurements.

Two of the syringes, including the one aimed at the reference thermistor, are generally filled with solvent and sample solutions for the remaining syringes are preferably arranged in order of increasing concentration to minimize the possibility of cross contamination errors. The syringes are inserted into the holder 15, thermal block 36 assuming the position shown in FIG. 3, keeping the hypodermic needles 58 away from the thermistors 75. Employing the viewing mirror 24, a syringe containing the reference solvent is lowered by rotating the knurled collar 63 fully clockwise. This moves the hypodermic needle 58 closely adjacent the reference thermistor 75. The feed screw knob 53 is then turned clockwise until the thermistor bead has been rinsed with at least 3 drops. One drop of solvent is then deposited on the reference thermistor bead. The first syringe containing the solvent is raised by rotating counter-clockwise until the pin 66 points away from the probe and rests on the high dwell of cam ramp 62. The procedure is then repeated with the second syringe containing solvent applying a drop to the sample thermistor and attempting to approximately match the size of the drops. Generally speaking, it will not be necessary to renew the reference solvent drop during measurement except when a new series is started. However, in cases where a slightly volatile solute or impure solvent such as denatured ethanol is employed, it has been found preferable to renew the reference solvent drop with each sample.

Under laboratory conditions it has been noted that capillarity between the syringe barrel and plunger produces solute incrustations about the top of the barrel over the barrel flange. For this reason, it is best to remove and rinse the syringes immediately following a sample series.

It is critical that measurements be made only when the temperature is stable, the solvent cup 47 is properly filled, all syringes are properly disposed within their holders in the thermal block 36, and the null indicator warmed for 30 minutes. The arrangement of plate member 44 and block 36 in housings 11, 12 provides a complete thermal envelope for the sample chamber 46 which, because of the use of low-density, Freon-blown urethane foam 43 together with a suitable electric heating source, affords temperature control of the chamber to a precision of less than $\pm 0.001°$ C.

With solvent drops on both thermistors, temperature stability is checked by balancing bridge circuit 100 with potentiometer 27 and with switch 103 in the T position. A steady drift of the dial of null indicator 32 in one direction throughout a heating cycle will indicate that the chamber is still warming up, whereas a balanced swing to each side of zero throughout a cycle will indicate that stability has been reached.

The apparatus may then be reference checked by switching selector 103 to the $\Delta T$ position, setting the decade resistance dials 25 to zero and balancing the bridge with potentiometer 26 until null detector 32 is centered on null or zero.

After the temperature stability and reference have been checked, a syringe containing a sample solution is lowered, the sample thermistor bead rinsed with sample solution and a drop of the test sample deposited thereon and the syringe retracted. Readings are then taken at one minute intervals for 5 minutes after the null detector has been centered by adjusting the dials of resistance dial 25. After a few trials it will be found possible to select a fixed time, i.e., 1, 2 or 5 minutes, and take a single reading at that time.

Generally speaking, the shortest time in which the reading is sufficiently stable to be read should be employed. Thus at one minute the difference, $\Delta R$, in resistance of thermistors 75 may be drifting, but if the drift is sufficiently slow to obtain a valid reading, replications are possible one minute after a fresh drop of the same sample is applied. Preferably the electrical characteristics of bridge circuit 100 are such that R may be read to the nearest 0.1 ohm from decade resistor dials 25 and estimated to the nearest 0.01 ohm from the dial of null detector 32. The bridge voltage is set so that 1 ohm on resistor 25 equals 10 mm. deflection of the null detector dial for sake of convenience. Thus, 0.1 mm. of dial 32 equals 0.01 ohm in the preferred model of the apparatus. Each sample solution of a series (up to four samples in the illustrated apparatus) may be thus sequentially compared with the reference solvent to determine the difference in resistance between the reference and sample thermistors. From a calibration curve or table, constructed in a conventional manner, the resistance difference, $\Delta R$, may be converted to solute concentration to which it is proportional. On completion of each sample series, the sample thermistor should be rinsed with solvent and the zero point rechecked. The null detector dial should reproduce the initial balanced indication within $\pm 0.5$ mm. It has been found that if the final sample in the series was of high concentration, 8–10 drops of solvent may be required for rinsing.

The instrument must be calibrated with a known solute for each solvent to be used. Of the many solutes which may be employed for the purposes of the present invention, benzil has been found to be an excellent reference for most organic solvents. Dextrose, urea or NaCl are preferred for water. Solutions are made to cover the entire range expected in samples. Normally, six values ranging from approximately 0.01 M to 0.1 M give a satisfactory curve. Employing conventional graphing techniques, the calibration curve may be constructed in terms of molar, molal, or mole fraction terms, depending on the specific problem to be solved.

Although the invention has been described and illustrated in detail it will be understood that various modifications may be resorted to within the spirit and scope of the appended claims.

We claim:

1. Apparatus for use in determining the molecular weight of a solute in solution, comprising: a housing enclosing a sample chamber and substantially isolating the same from the atmosphere, conditioning means for maintaining a stable, conditioned environment in said chamber, a pair of thermistors and a circuit connecting the same for measuring a temperature difference therebetween, means mounting said thermistors in fixed, spaced relation centrally of said chamber, a plurality of liquid ejecting devices for loading drops of such solution and the solvent thereof on said thermistors, means mounting each of said devices on said housing for projecting into said chamber and for movement from a loading position closely adjacent one of said thermistors to a retracted position removed therefrom.

2. Apparatus for use in determining the molecular weight of a solute in solution, comprising: a housing enclosing a sample chamber and substantially isolating the same from the atmosphere, conditioning means for maintaining a stable conditioned environment in said chamber, a pair of thermistors and a circuit connecting the same for measuring a temperature difference therebetween, means mounting said thermistors in fixed, spaced relation centrally of said chamber, a plurality of liquid ejecting devices for loading drops of such solution and the solvent thereof on said thermistors, means mounting each of said devices on said housing for projecting into said chamber and for movement from a loading position closely adjacent one of said thermistors to a retracted position removed therefrom, said conditioning means including a liquid reservoir received in said chamber and an absorbent vapor wick therein for saturating the atmosphere in said chamber with such solvent.

3. Apparatus for use in determining the molecular weight of a solute in solution, comprising: a housing enclosing a sample chamber, conditioning means for maintaining a stable conditioned environment in said chamber, a pair of thermistors and a circuit connecting the same for measuring a temperature difference therebetween, means mounting said thermistors in fixed, spaced relation centrally of said chamber, a plurality of liquid ejecting devices for loading drops of such solution and the solvent thereof on said thermistors, means mounting each of said devices on said housing for projecting into said chamber and for movement from a loading position closely adjacent one of said thermistors to a retracted position removed therefrom, said devices including hypodermic syringes, and said means mounting said devices including elongated hollow tubes opening outwardly of said housing and into said chamber and closely receiving said syringes for movement longitudinally thereof.

4. Apparatus for use in determining the molecular weight of a solute in solution, comprising: a housing enclosing a sample chamber, conditioning means for maintaining a stable, conditioned environment in said chamber, a pair of thermistors and a circuit connecting the same for measuring a temperature difference therebetween, means mounting said thermistors in fixed, spaced relation centrally of said chamber, a plurality of liquid ejecting devices for loading drops of such solution and the solvent thereof on said thermistors, means mounting each of said devices on said housing for projecting into said chamber and for movement from a loading position closely adjacent one of said thermistors to a retracted position removed therefrom, said devices including hypodermic syringes, and said means mounting said devices including elongated hollow tubes opening outwardly of said housing and into said chamber and closely receiving said syringes for movement longitudinally thereof, the longitudinal axes of said tubes converging centrally of said chamber and said axis of at least one of said tubes intersecting one of said thermistors and said axes of the other of said tubes intersecting the other of said thermistors.

5. Apparatus for use in determining the molecular weight of a solute in solution, comprising: a housing enclosing a sample chamber, conditioning means for maintaining a stable, conditioned environment in said chamber, a pair of thermistors and a circuit connecting the same for measuring a temperature difference therebetween, means mounting said thermistors in fixed, spaced relation centrally of said chamber, a plurality of liquid ejecting devices for loading drops of such solution and the solvent thereof on said thermistors, means mounting each of said devices on said housing for projecting into said chamber and for movement from a loading position closely adjacent one of said thermistors to a retracted position removed therefrom, and viewing apertures formed in said housing in alignment with said thermistors.

6. Apparatus for use in accurately measuring minute temperature differences between solvents and solutions thereof, comprising: an insulated thermal envelope including separable upper and lower portions thereof defining a sample chamber therebetween substantially isolated from the atmosphere, a pair of thermally sensitive elements connected in a measuring circuit for indicating the temperature difference between said elements, supporting means carried by said upper portion and mounting said elements in fixed, spaced relation generally centrally of said chamber, and a plurality of solution and solvent dispensing devices carried by said upper portion and projecting into said chamber for applying solvent to one of said elements and solution to the other, said envelope including an inner metallic block having heating means thereon and an outer, rigid blanket of insulating material.

7. Apparatus for use in accurately measuring minute temperature differences between solvents and solutions thereof, comprising: an insulated thermal envelope including separable upper and lower portions thereof defining a sample chamber therebetween substantially isolated from the atmosphere, a pair of thermally sensitive elements connected in a measuring circuit for indicating the temperature difference between said elements, supporting means carried by said upper portion and mounting said elements in fixed, spaced relation generally centrally of said chamber, and a plurality of solution and solvent dispensing devices carried by said upper portion and projecting into said chamber for applying solvent to one of said elements and solution to the other, a reservoir in said chamber for containing solvent, and a tubular wick of absorbent material extending into said reservoir and surrounding said elements for saturating said chamber with vapor of said solvent, and apertures formed through said envelope and said wick in alignment with said elements for viewing the same.

8. Apparatus for use in accurately measuring minute temperature differences between solvents and solutions thereof, comprising: an insulated thermal envelope including separable upper and lower portions thereof defining a sample chamber therebetween substantially isolated from the atmosphere, a pair of thermally sensitive elements connected in a measuring circuit for indicating the temperature difference between said elements, supporting means carried by said upper portion and mounting said elements in fixed, spaced relation generally centrally of said chamber, and a plurality of solution and solvent dispensing devices carried by said upper portion and projecting into said chamber for applying solvent to one of said elements and solution to the other, said devices including hypodermic syringes and means mounting each said syringe for controlled movement from a loading position closely adjacent one of said elements to a retracted position removed therefrom.

9. Apparatus for use in accurately measuring minute temperature differences between solvents and solutions thereof, comprising: an insulated thermal envelope including separable upper and lower portions thereof defining a sample chamber therebetween substantially isolated from the atmosphere, a pair of thermally sensitive elements connected in a measuring circuit for indicating the temperature difference between said elements, supporting means carried by said upper portion and mounting said elements in fixed, spaced relation generally centrally of said chamber, a plurality of elongated tubular holders extending through said upper portion and opening outwardly of said upper portion and inwardly of said chamber each adapted to closely slidably receive therein a hypodermic syringe having a tubular barrel and a coaxial needle projecting therefrom with said needle projecting into said chamber, at least one of said holders being aligned with one of said elements and the other of said holders being aligned with the other of said elements, retracting means adapted to be connected to each syringe in each of said holders for axially moving said syringe from a loading position with said needle closely adjacent said element outwardly of said chamber to a retracted position with said needle removed from said element, and stop means limiting the movement of said syringe inwardly of said chamber past said loading position.

10. Apparatus for use in accurately measuring minute temperature differences between solvents and solutions thereof, comprising: an insulated thermal envelope including separable upper and lower portions thereof defining a sample chamber therebetween substantially isolated from the atmosphere, a pair of thermally sensitive elements connected in a measuring circuit for indicating the temperature difference between said elements, supporting means carried by said upper portion and mounting said elements in fixed, spaced relation generally centrally of said chamber, a plurality of elongated tubular holders extending through said upper portion and opening outwardly of said upper portion and inwardly of said chamber each adapted to closely slidably receive therein a hypodermic syringe having a tubular barrel and a coaxial needle projecting therefrom with said needle projecting into said chamber, at least one of said holders being aligned with one of said elements and the other of said holders being aligned with the other of said elements, retracting means adapted to be connected to each syringe in each of said holders for axially moving said syringe from a loading position with said needle closely adjacent said element outwardly of said chamber to a retracted position with said needle removed from said element, and stop means limiting the movement of said syringe inwardly of said chamber past said loading position, and a feed screw adapted to engage each said syringe in each said holder for controlling the dispensing of solution and solvent therefrom into said elements.

References Cited by the Examiner
UNITED STATES PATENTS
3,088,319   3/63   Neumayer _____ 73—342

OTHER REFERENCES

Publication: Use of Thermistors in Precise Measurement of Small Temperature Differences, by Muller and Stolten, Analytical Chemistry, volume 25, No. 7, July 1953, pages 1103–1106.

RICHARD C. QUEISSER, *Primary Examiner.*

ROBERT L. EVANS, JOSEPH P. STRIZAK,
*Examiners.*